(12) United States Patent
Han et al.

(10) Patent No.: US 10,763,711 B2
(45) Date of Patent: Sep. 1, 2020

(54) MOTOR ROTOR INCLUDING ROTOR CORE AND MANUFACTURING METHOD THEREFOR

(71) Applicant: KOH-A JUNG GONG CO., LTD., Daegu (KR)

(72) Inventors: Man Seung Han, Daegu (KR); Sung Ryeul Hong, Daegu (KR); Min Young Park, Daegu (KR); Myung Sub Ahn, Daegu (KR); Ey Rang Kim, Daegu (KR)

(73) Assignee: KOH-A JUNG GONG CO., LTD., Daegu (KR)

( * ) Notice: Subject to any disclaimer, the term of this patent is extended or adjusted under 35 U.S.C. 154(b) by 415 days.

(21) Appl. No.: 15/559,597

(22) PCT Filed: Mar. 18, 2016

(86) PCT No.: PCT/KR2016/002776
§ 371 (c)(1),
(2) Date: Sep. 19, 2017

(87) PCT Pub. No.: WO2016/148541
PCT Pub. Date: Sep. 22, 2016

(65) Prior Publication Data
US 2018/0069443 A1 Mar. 8, 2018

(30) Foreign Application Priority Data
Mar. 19, 2015 (KR) .................. 10-2015-0038113

(51) Int. Cl.
*H02K 1/26* (2006.01)
*H02K 1/27* (2006.01)
*H02K 15/03* (2006.01)
*H02K 1/28* (2006.01)

(52) U.S. Cl.
CPC ............... *H02K 1/265* (2013.01); *H02K 1/27* (2013.01); *H02K 1/2773* (2013.01); *H02K 1/28* (2013.01); *H02K 15/03* (2013.01); *H02K 2213/03* (2013.01)

(58) Field of Classification Search
CPC ........ H02K 1/265; H02K 1/27; H02K 1/2723; H02K 1/28; H02K 15/03; H02K 2213/03
See application file for complete search history.

(56) References Cited

U.S. PATENT DOCUMENTS 5,786,650 A * 7/1998 Uchida ............... H02K 1/2773
310/156.55
8,519,588 B2 8/2013 Amrhein et al.

FOREIGN PATENT DOCUMENTS

| CN | 103973003 A * | 8/2014 |
| CN | 103973003 A | 8/2014 |
| KR | 10-0225193 B1 | 10/1999 |

* cited by examiner

Primary Examiner — Jue Zhang
(74) Attorney, Agent, or Firm — Saliwanchik, Lloyd & Eisenschenk (57) ABSTRACT

A motor rotor and a manufacturing method therefor are disclosed. The motor rotor is disposed inside a stator so as to rotate by electromagnetically interacting with the stator, and includes: a rotor core formed by stacking a plurality of stack plates including first plate members and second plate members, and including a shaft hole, a plurality of rotor poles, and a plurality of magnet-embedded portions; and a plurality of permanent magnets inserted into the plurality of magnet-embedded portions.

9 Claims, 10 Drawing Sheets

MOTOR ROTOR INCLUDING ROTOR CORE AND MANUFACTURING METHOD THEREFOR

CROSS REFERENCE TO A RELATED APPLICATION

This application is a National Stage Application of International Application Number PCT/KR2016/002776, filed Mar. 18, 2016; which claims priority to Korean Patent Application No. 10-2015-0038113, filed Mar. 19, 2015; both of which are incorporated herein by reference in their entirety.

TECHNICAL FIELD

The present invention relates to a motor rotor and a manufacturing method therefor and, more specifically, to a motor rotor including a rotor core and a manufacturing method therefor, which has an improved structural strength and which are capable of enhancing the efficiency of a motor.

BACKGROUND

A motor is a machine that obtains a rotational force from electric energy and includes a stator and a rotor. The rotor is arranged inside or outside the stator and is configured to electromagnetically interact with the stator. The rotor is rotated by a force acting between a magnetic field and a current flowing through a coil.

Permanent magnet motors using a permanent magnet to generate a magnetic field may be classified into a surface-mounted permanent magnet motor, an interior type permanent magnet motor and a spoke type permanent magnet motor. Among them, the spoke type permanent magnet motor structurally has a high magnetic flux concentration degree. Therefore, the spoke type permanent magnet motor is capable of generating a high torque and a high output and can be reduced in size for the same output. Therefore, the spoke type permanent magnet motor may be usefully applied to a driving motor for a washing machine, a driving motor for an electric vehicle, a driving motor for a small-sized generator, and the like, which require high torque and high output characteristics.

Such a spoke type permanent magnet motor generally includes permanent magnets arranged radially around a shaft of the motor and a rotor core provided so as to support the permanent magnets and form a passage of the magnetic flux. The rotor core supports the permanent magnets by means of rotor poles protruding from the periphery of the shaft. However, when the connection portions between the rotor poles and the periphery of the shaft are formed thick, the magnetic flux is leaked through the connection portions, whereby the efficiency of the motor may be reduced. Therefore, in order to enhance the efficiency of the motor, it is important to form the connection portions thin.

However, in the case of thinly forming the connection portions, the structural strength of the rotor core is reduced. This may pose a problem that the rotor core is deformed or damaged during the process of high speed rotation of the rotor. In addition, the rotor poles may be loosened and may be unable to strongly support the permanent magnets. Thus, the permanent magnets may be separated from the rotor core by the centrifugal force generated by rotation.

SUMMARY

Embodiments of the present invention provide a motor rotor including a rotor core, which has an improved structure so as to improve the strength.

Furthermore, embodiments of the present invention provide a motor rotor including a rotor core which is capable of minimizing leakage of a magnetic flux due to a rotor core and enhancing the efficiency of a motor including the motor rotor.

Moreover, embodiments of the present invention provide a motor rotor manufacturing method which is capable of simplifying a manufacturing process using the same process line.

In accordance with a first aspect of the present invention, there is provided a motor rotor which is disposed inside a stator to rotate by electromagnetically interacting with the stator, the motor rotor including: a rotor core formed by stacking a plurality of stacked plates including first plate members and second plate members, the rotor core including a shaft hole into which a shaft is inserted, a plurality of rotor poles arranged outside the shaft hole so as to be spaced apart from one another along a circumferential direction of the rotor, and a plurality of magnet-embedded portions formed between the rotor poles; and a plurality of permanent magnets inserted into the magnet-embedded portions, wherein each of the first plate members includes at least one first slot extending in a radial direction of the rotor and having an open radial outer end, each of the second plate members includes at least one second slot extending in the radial direction of the rotor and having a closed radial outer end, and the first slot of each of the first plate members and the second slot of each of the second plate members are overlapped with each other to form at least one of the magnet-embedded portions.

In accordance with a second aspect of the present invention, there is provided a motor rotor which is disposed inside a stator to rotate by electromagnetically interacting with the stator, the motor rotor including: a rotor core formed by stacking a plurality of stacked plates, the rotor core including a shaft hole into which a shaft is inserted, a plurality of rotor poles arranged outside the shaft hole so as to be spaced apart from one another along a circumferential direction of the rotor, and a plurality of magnet-embedded portions formed between the rotor poles; and a plurality of permanent magnets inserted into the magnet-embedded portions, wherein open portions and reinforcement portions are alternately formed along an axial direction of the rotor in outer end portions of the magnet-embedded portions, and each of the reinforcement portions is disposed outside each of the permanent magnets and configured to connect outer ends of the rotor poles adjacent to each other.

In accordance with a third aspect of the present invention, there is provided a method for manufacturing a motor rotor, including: a step of forming a plurality of second slots in a first plate member and a second plate member, the second slots arranged so as to be spaced apart from one another along a circumferential direction of the rotor, the second slots extending in a radial direction of the rotor, each of the second slots having a closed radial outer end; a step of forming a first slot in the first plate member by removing the closed radial outer end of each of the second slots, the first slot having an open radial outer end; and a step of forming a stator core by stacking the first plate member and the second plate member so that the first slot of the first plate member overlaps with one of the second slots of the second plate member.

The motor rotor including a rotor core and the manufacturing method therefor according to the present invention have the following effects.

According to the embodiments of the present invention, the structural strength of the rotor core can be improved by forming the reinforcement portion. This makes it possible to further reduce the width of the connection portions connecting the rotor poles and the periphery of the shaft. As a result, it is possible to minimize leakage of a magnetic flux through the connection portions. In addition, the reinforcement portion is not formed on the entire outer side of the magnet-embedded portions. This makes it possible to minimize leakage of a magnetic flux through the reinforcement portion and to enhance the efficiency of a motor.

Furthermore, the manufacturing process can be simplified by using the same process line. Thus, the rotor can be easily manufactured without additional manufacturing equipment. This makes it possible to reduce the manufacturing cost.

DETAILED DESCRIPTION

Specific embodiments for embodying the concept of the present invention will now be described in detail with reference to the drawings.

In describing the present invention, if a concrete explanation on the relevant well-known configurations or functions may obscure the gist of the present invention, the detailed description thereof will be omitted. Further, in the following description, the axial direction Z (see FIG. 1) means the direction parallel to the shaft of the rotor. The circumferential direction Q (see FIG. 2) and the radial direction R (see FIG. 1) mean the circumferential direction and the radial direction of a circle around the shaft, respectively.

Figure 1:
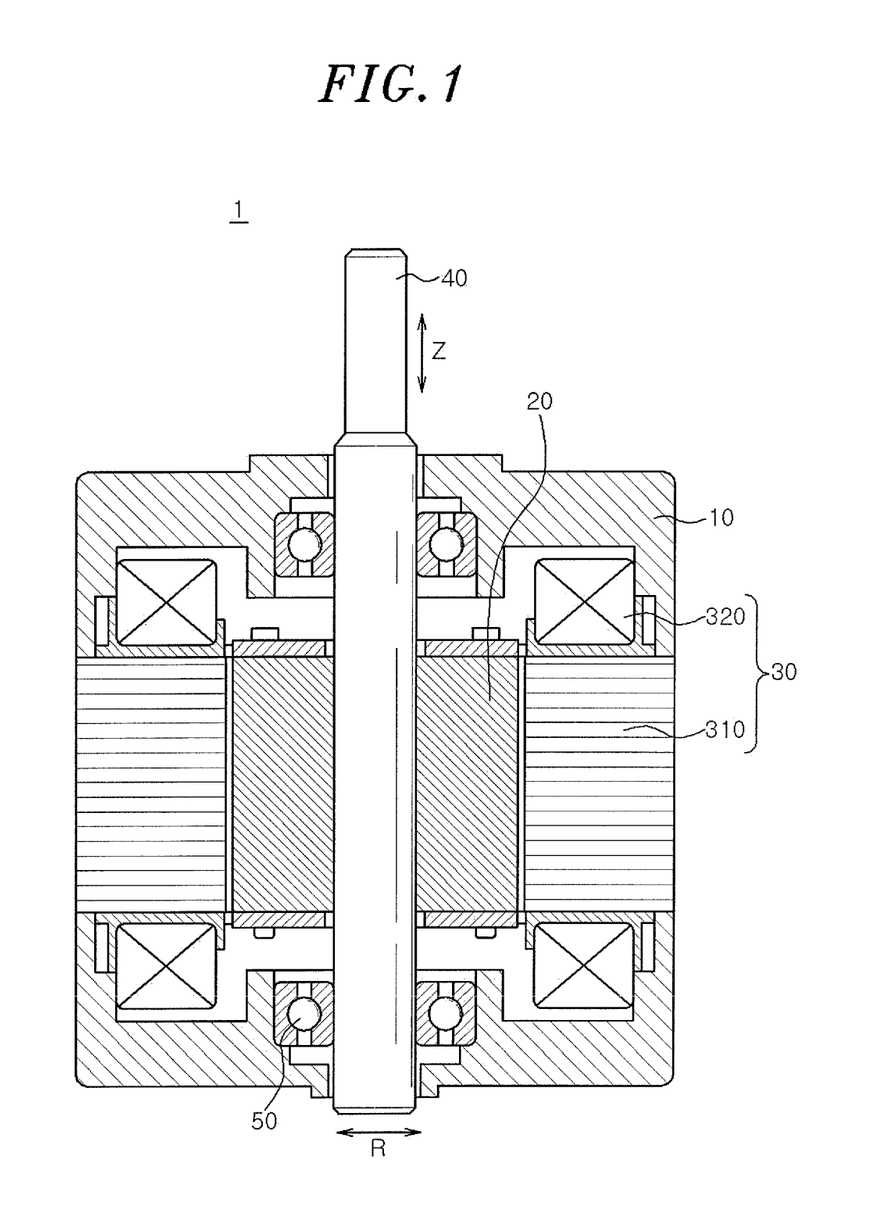
FIG. 1 is a sectional view of a motor according to one embodiment of the present invention.
Figure 2:
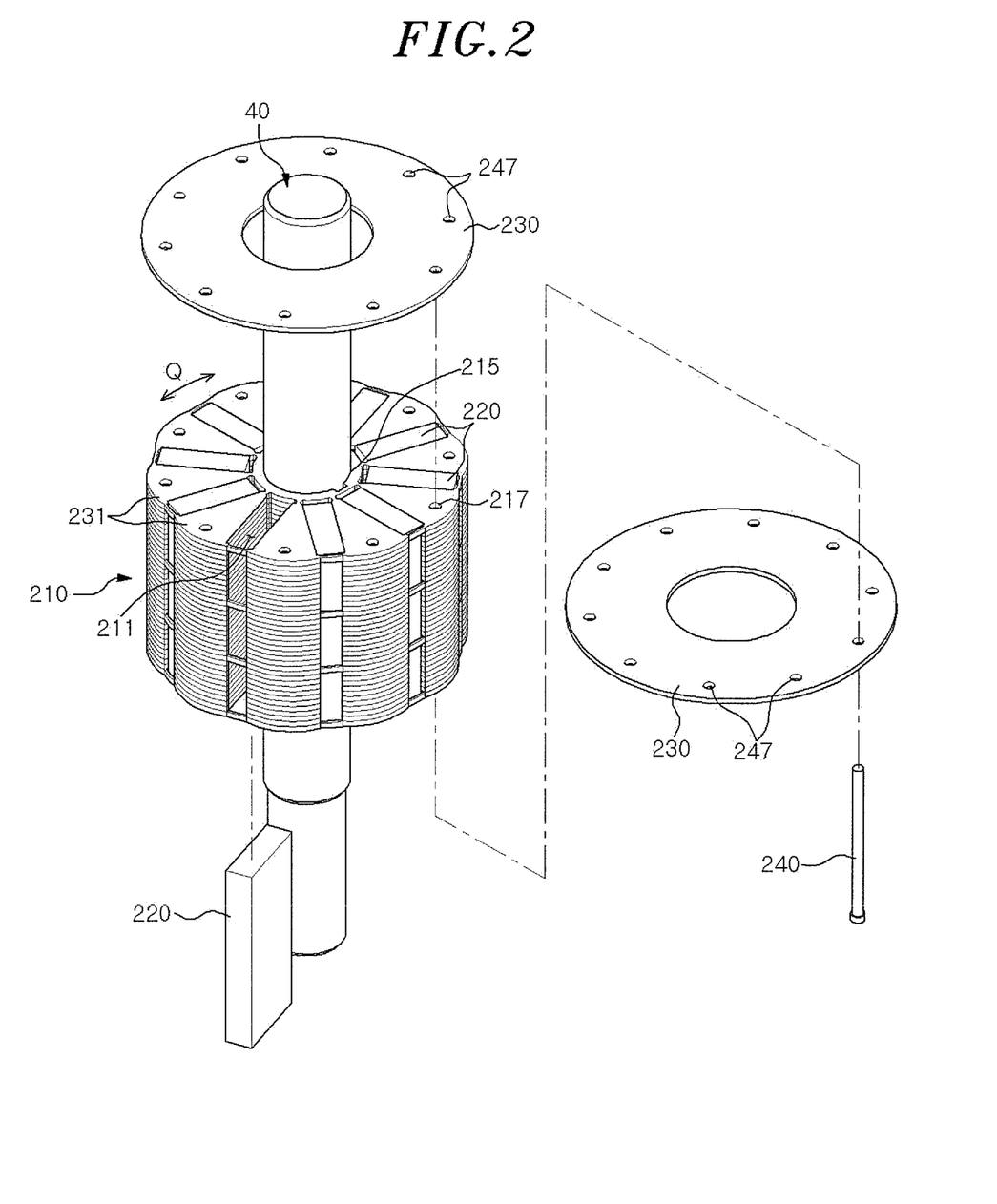
FIG. 2 is an exploded perspective view showing one example of the rotor shown in FIG. 1.
Figure 3:
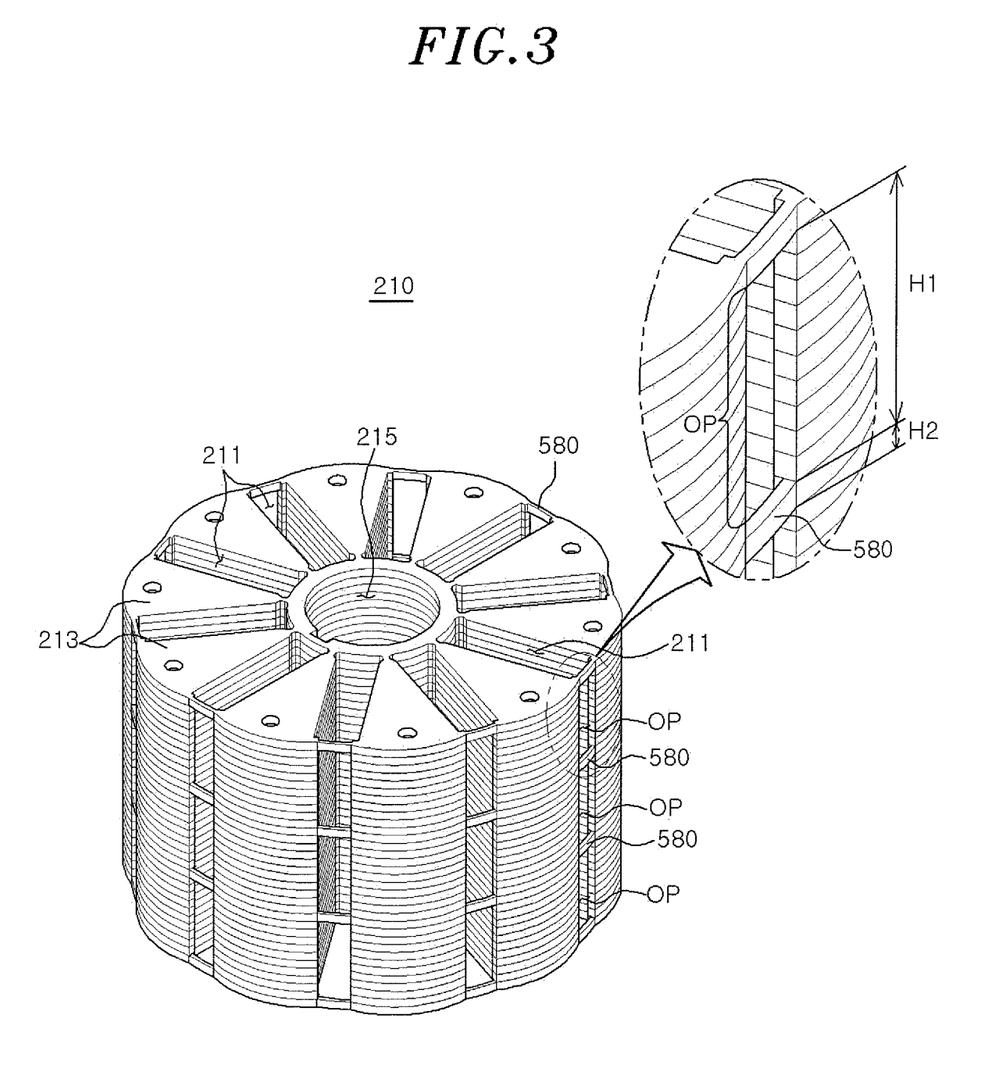
FIG. 3 is a perspective view showing one example of the rotor core shown in FIG. 2.

FIG. 1 is a sectional view of a motor 1 according to one embodiment of the present invention. FIG. 2 is an exploded perspective view showing one example of the rotor 20 shown in FIG. 1. FIG. 3 is a perspective view showing one example of the rotor core 210 shown in FIG. 2.

Referring to FIG. 1, the motor 1 may include a motor housing 10 forming an outer shell of the motor 1, a stator 30 and a rotor 20 accommodated inside the motor housing 10, and a shaft 40 connected to the rotor 20. The stator 30 may be fixed to the motor housing 10, and the rotor 20 may be arranged inside the stator 30. The rotor 20 is configured to rotate by electromagnetically interacting with the stator 30. The shaft 40 is inserted and fixed to the center of the rotor 20. Such a shaft 40 may rotate together with the rotor 20. One end portion of the shaft 40 may protrude to the outside via an opening formed in the motor housing 10. In addition, if necessary, the shaft 40 may be supported by the motor housing 10 via a bearing 50 or the like.

Specifically, the stator 30 may include a stator core 310 and a coil 320. The stator core 310 is in the form of a hollow shell. An empty space for accommodating the rotor 20 may be formed in the central portion of the stator core 310. The stator core 310 may be formed by stacking pressed iron plates and may include a plurality of teeth protruding radially inward. The teeth may be arranged so as to be separated from each other along the circumferential direction of the stator 30. The coil 320 may be accommodated in a space between two adjacent teeth by being wound around the teeth. The coil 320 may connected to an external power source and may be applied with a voltage. When the voltage is applied, the coil 320 may generate an electromagnetic field which interacts with the permanent magnets 220 of the rotor 20.

Referring to FIG. 2, the rotor 20 may include a rotor core 210 arranged inside the stator core 310 and permanent magnets 220 inserted into the rotor core 210.

Referring to FIG. 3, the rotor core 210 may have a form in which a plurality of plate members is stacked in the axial direction of the rotor. These stacked plates 500 are made of a magnetic material (a ferromagnetic material or a magnetically permeable material) and may be formed by pressing silicon steel plates, for example. In each of the stacked plates 500, a first through-hole 510 into which the shaft 40 is inserted and slot portions 520 into which the permanent magnets 220 are inserted may be formed so as to penetrate each of the stacked plates 500.

The rotor core 210 may be formed by stacking a plurality of stacked plates 500 such that the first through-holes 510 and the slot portions 520 formed in the respective stacked plates 500 overlap. At this time, the overlapping first through-holes 510 may form a shaft hole 215 axially penetrating the rotor core 210, and the overlapping slot portions 520 may form magnet-embedded portions 211 axially penetrating the rotor core 210. The shaft hole 215 may be located at the center of the rotor core 210. In addition, the magnet-embedded portions 211 may be formed in the rotor core 210 and may be arranged around the shaft hole 215 so as to be spaced apart from each other in the circumferential direction. The magnet-embedded portions 211 may have a shape elongated in the radial direction of the rotor and may be provided radially around the shaft hole 215.

A rotor pole 213 may be formed between two adjacent magnet-embedded portions 211 by the stacked plates 500. A plurality of rotor poles 213 may be provided in a corresponding relationship with the magnet-embedded portions 211 and may be arranged so as to be spaced from each other by the gap corresponding to the width of each of the magnet-embedded portions 211 along the circumferential direction of the rotor. For example, the rotor poles 213 may protrude radially away from the shaft hole 215. These rotor poles 213 are opposed to the teeth of the stator 30. The number of the rotor poles 213 may be the same as the number of the teeth of the stator 30.

The permanent magnets 220 may be provided in a plural number and may inserted into the corresponding magnet-embedded portions 211, respectively. Thus, the permanent magnets 220 may also be arranged along the circumferential direction of the rotor 20 so as to be located radially around the shaft hole 215. The permanent magnets 220 may be ferrite magnets. Alternatively, the permanent magnets 220 may be magnets containing rare earth elements such as neodymium, samarium and the like. In the drawings, there is illustrated an example in which ten magnet-embedded portions 211 and ten permanent magnets 220 are provided. However, the number of the permanent magnets 220 may be changed.

On the other hand, as shown in FIG. 2, the rotor 20 may further include a pair of covers 230 provided on both axial sides. The covers 230 may cover the axial end portions of the rotor from the outside, thereby preventing the permanent magnets 220 from being detached from the rotor core 210. The covers 230 may be made of a nonmagnetic material such as copper, stainless steel or the like.

In addition, the rotor 20 may further include a fastening member 240 for coupling the rotor core 210 and the covers 230. To this end, a fastening hole 217 penetrating one of the rotor poles 213 in the axial direction of the rotor may be formed in at least one of the rotor poles 213 of the rotor core 210. The fastening hole 217 may be formed by overlapping second through-holes 590 formed in the respective stacked plates 500. A through hole 247 may be formed in each of the covers 230 so as to correspond to the fastening hole 217 formed in the rotor core 210. After arranging the covers 230 on both sides of the rotor core 210, the fastening member 240 is inserted into and fastened to both the through hole 247 and the fastening hole 217. This makes it possible to fix the covers 230 to the rotor core 210.

Figure 4:
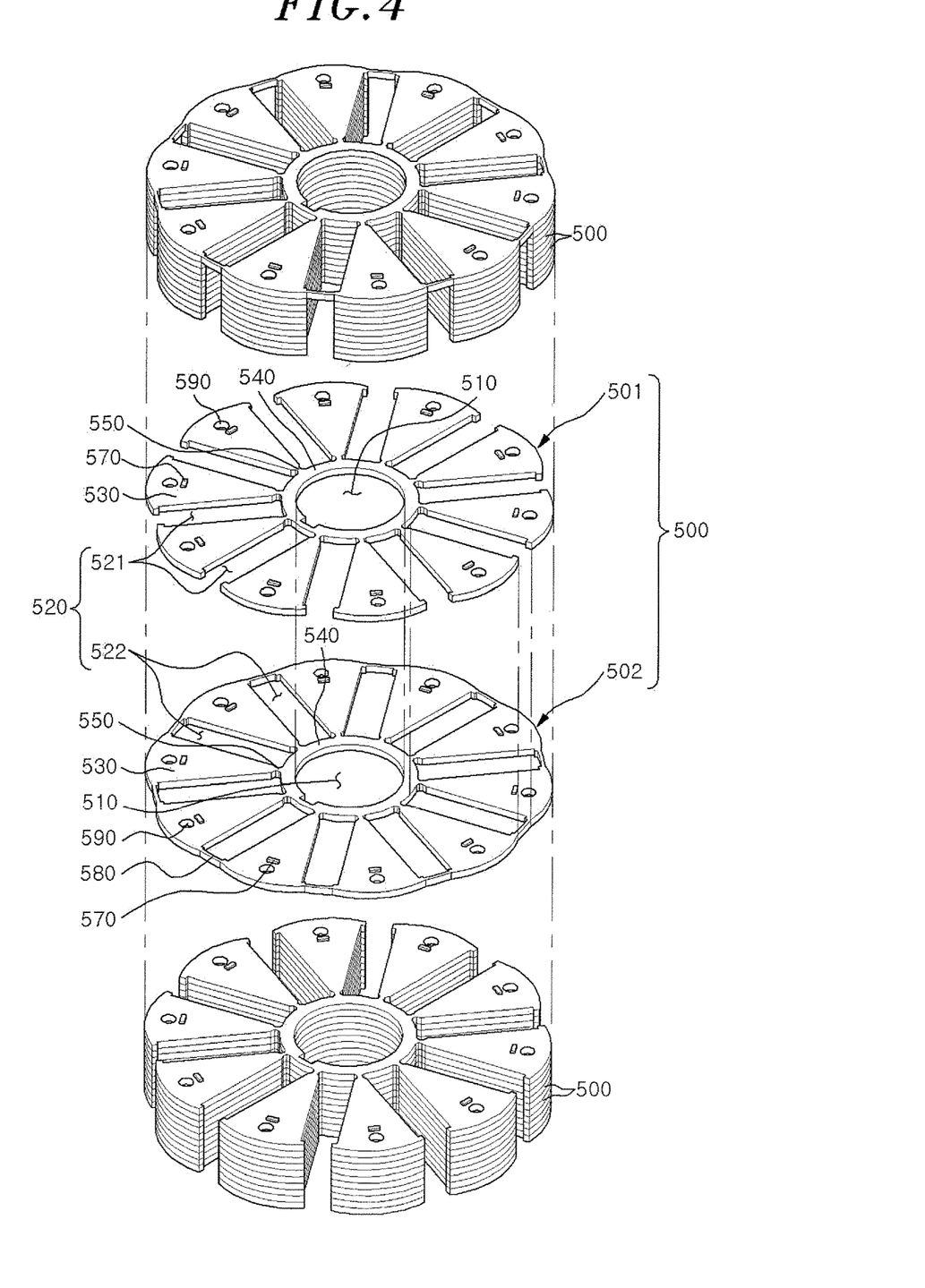
FIG. 4 is a view showing the rotor core shown in FIG. 3, in an exploded state.
Figure 5:
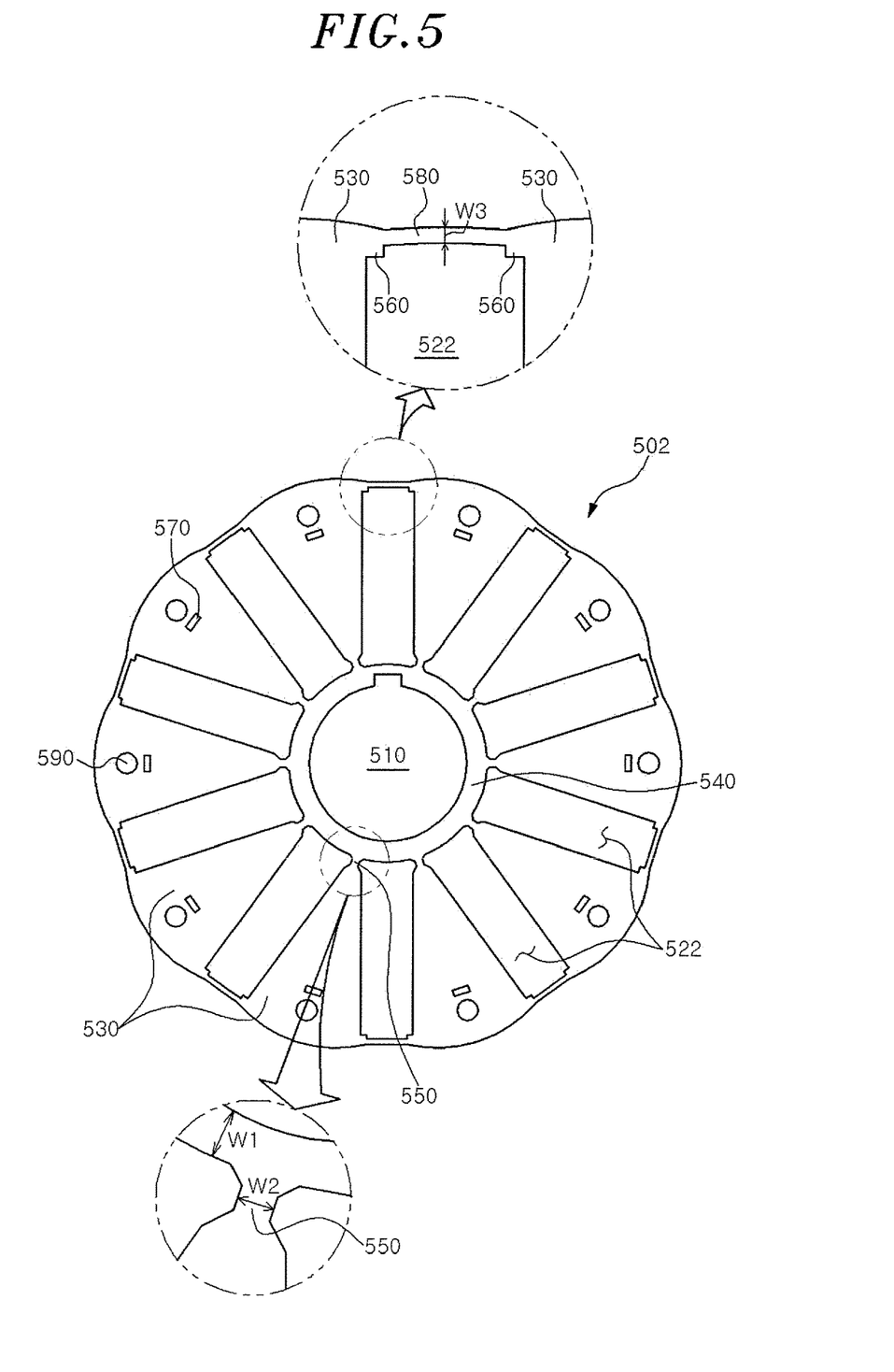
FIG. 5 is a plan view showing a second plate member shown in FIG. 4.

FIG. 4 is a view showing the rotor core 210 shown in FIG. 3, in an exploded state. FIG. 5 is a plan view showing one example of the second plate member 502 shown in FIG. 4.

Referring to FIG. 4, in the stacked plates 500 forming the rotor core 210, there may be formed the first through-holes 510 for defining the shaft hole 215 and the slot portions 520 for defining the magnet-embedded portions 211. In this regard, a protrusion portion 530 may be formed between two adjacent slot portions 520.

The first through-holes 510 may have a predetermined diameter and may be located at the center of the stacked plates 500. Specifically, the first through-holes 510 may be defined by annular support portions 540. Each of the support portions 540 has an inner periphery opposed to the shaft 40 inserted into the first through-holes 510 and an outer periphery facing the permanent magnets 220 inserted into the magnet-embedded portions 211. The inner periphery may define the first through-holes 510. The support portions 540 may be connected to protrusion portions 530 via connection portions 550.

The radial width W1 of the support portions 540, namely the difference in diameter between the inner periphery and the outer periphery, may be 1 mm or more and 20 mm or less. If the width W1 of the support portions 540 is larger than 20 mm, the magnetic flux leaked via the support portions 540 becomes large and the performance of the motor 1 is reduced. On the other hand, the lower limit value 1 mm of the width W1 of the support portions 540 is the minimum width for supporting the shaft 40 and for withstanding the weight of the protrusion portions 530 connected to the support portions 540. If the width W1 of the support portions 540 is smaller than 1 mm, there may be generated a structural problem such as deformation of the support portions 540 or the like.

Around the support portions 540, the slot portions 520 may be arranged so as to be spaced apart from each other along the circumferential direction of the rotor. As described above, the permanent magnets 220 may be inserted into the slot portions 520. The respective slot portions 520 may extend from the outer periphery of the support portions 540 in the radial direction of the rotor.

The protrusion portions 530 may be formed between the slot portions 520. For example, if the slot portions 520 are formed in the stacked plates 500 so as to be spaced apart from each other in the circumferential direction, the portions of the stacked plates 500 left between two adjacent slot portions 520 may form the protrusion portions 530. Similar to the slot portions 520, the protrusion portions 530 may be arranged around the support portions 540 so as to be spaced apart from each other along the circumferential direction of the rotor 20. The protrusion portions 530 may support the permanent magnets 220 inserted into the slot portions 520 and may form a passage of the magnetic flux generated from the permanent magnets 220.

As mentioned above, the respective protrusion portions 530 may be connected to the support portions 540 via the connection portions 550. Specifically, the connection portions 550 may protrude radially from the outer periphery of the support portions 540 and may extend to the inner ends of the protrusion portions 530. The connection portions 550 may be provided in a plural number in a corresponding relationship with the protrusion portions 530. Similar to the protrusion portions 530, the connection portions 550 may be arranged around the support portions 540 so as to be spaced apart from each other along the circumferential direction of the rotor 20.

In this regard, the circumferential width W2 of the connection portions 550 may be 0.1 mm or more and 10 mm or less. If the width W2 of the connection portions 550 is smaller than 0.1 mm, the connection portions 550 may not have rigidity large enough to support the protrusion portions 530. This may pose a problem that the connection portions 550 are damaged or deformed during high speed rotation. In addition, if the width W2 of the connection portions 550 is larger than 10 mm, the magnetic flux escaping toward the support portions 540 via the connection portions 550 may increase, and the performance of the motor 1 may be reduced. The width W2 of the connection portions 550 may be further reduced by forming the reinforcement portions 580 to be described later. In this case, the width W2 of the connection portions 550 may preferably be 5 mm or less.

According to one example, outer protrusions 560 protruding in the circumferential direction of the rotor may be formed on the radial outer side of the protrusion portions 530. The outer protrusions 560 may respectively protrude toward the slot portions 520 from the protrusion portions 530 provided on both sides of the slot portions 520. The outer protrusions 560 may make contact with the outer ends of the permanent magnets 220 inserted into the slot portions 520 and may support the permanent magnets 220. By supporting the outer ends of the permanent magnets 220, the outer protrusions 560 may prevent the permanent magnets 220 from being pulled out from the rotor core 210 by a centrifugal force during the rotation of the rotor 20.

The support portions 540, the connection portions 550, the protrusion portions 530 and the outer protrusions 560 may be integrally formed by the same material. For example, they may be formed by pressing one plate material into the corresponding shape.

In order to fix the stacked plates 500 in a stacked state, the two stacked plates 500 may be fitted to each other via joint portions 570 formed in the respective protrusion portions 530. One joint portion 570 may be formed in at least one of the protrusion portions 530 of each of the stacked plates 500 so as to protrude in the axial direction of the rotor. An empty space into which another joint portion 570 can be inserted may be formed inside the protruding portion of the joint portion 570. The joint portion 570 of another stacked plate 500 may be inserted and fitted into the empty space area inside the joint portion 570 of one stacked plate 500. If necessary, a protrusion, a hook or the like (not shown) may be formed in the empty space inside the joint portion 570 in order to ensure strong joining between the joint portions 570.

Alternatively, the stacked plates 500 may be joined in other ways. For example, the fastening member 240 described above may be fastened through the second through-holes 590 without having to use another joint means, whereby the stacked plates 500 may be firmly fixed to each other in a mutually contacting state. Alternatively, the stacked plates 500 may be bonded to each other by an adhesive or the like.

In the present embodiment, the slot portions 520 may be formed in the form of first slots 521 or second slots 522. As shown in FIG. 4, the first slots 521 may be inwardly recessed from the outer peripheral edge of the stacked plates 500 toward the center with the radial outer ends thereof opened. On the other hand, the second slots 522 may be formed so that the radial outer ends thereof are closed. For example, the second slots 522 may be holes spaced apart inward from the outer peripheral edge of the stacked plate 500 and formed to penetrate the stacked plate 500. For this reason, as shown in FIG. 5, reinforcement portions 580 may be formed outside the second slots 522.

Referring to FIG. 5, the reinforcement portions 580 are configured to connect the outer ends of two protrusion portions 530 formed on both sides of the second slots 522 and may be integrally formed by the same material as the protrusion portions 530. For example, when the second slots 522 are formed in the stacked plate 500 so as to be spaced apart inward from the outer peripheral edge of the stacked plate 500, the plate portion left between the radial outer end of the second slot 522 and the outer peripheral edge of the stacked plate 500 may form the reinforcement portion 580.

In this regard, the reinforcement portion 580 may protrude from the outer protrusions 560 in the circumferential direction of the rotor and may be configured to connect two opposing outer protrusions 560. That is to say, the reinforcement portion 580 may be positioned on the same line as the outer protrusions 560 in the radial direction of the rotor. According to one example, as shown in FIG. 5 as an enlarged view, the radial width W3 of the reinforcement portion 580 may be smaller than the width of the outer protrusions 560. In this case, the reinforcement portion 580 may be biased toward the outside in the radial direction of the rotor 20. A step may be formed radially inward of the reinforcement portion 580.

Thus, there is no need to go through a complex process in order to form the reinforcement portion 580 in a spaced-apart relationship with the outer protrusions 560. This makes it possible to eliminate a manufacturing difficulty. In addition, no separation space is formed between the reinforcement portion 580 and the outer protrusions 560. Thus, the reinforcement portion 580 may receive the centrifugal force applied to the outer protrusions 560 by the permanent magnet 220 during the rotation of the rotor 20. The reinforcement portion 580 also serves to reinforce the outer protrusions 560. This makes it possible to further stabilize the structure of the rotor core 210.

According to another embodiment, the reinforcement portion 580 may be formed to have the same width as the outer protrusions 560. In this case, the outer protrusions 560 may not be distinguished from the reinforcement portion 580, and the reinforcement portion 580 may play the role of the outer protrusions 560. That is to say, the permanent magnet 220 may make contact with the radial inner end of the reinforcement portion 580. The reinforcement portion 580 may prevent the permanent magnet 220 from being pulled out during to rotation of the rotor 20. In this case, it is possible to further simplify the pressing process.

As described above, by forming the reinforcement portion 580 in the second slot 522, it is possible to enhance the structural strength of the stacked plate 500. The reinforcement portion 580 may support the protrusion portions 530 in the circumferential direction of the rotor by connecting the protrusion portions 530 on both sides of the second slot 522. As a result, the protrusion portions 530 do not move in the lateral direction, whereby the structural stability may be enhanced. Even when the width of the connection portion 550 connecting the protrusion portion 530 and the support portion 540 is made small, it is possible to maintain a certain level of structural stability. As a result, while maintaining the structural strength of the stacked plate 500, it is possible to reduce the amount of a magnetic flux leaked to the support portion 540 via the connection portion 550. This makes it possible to improve the performance of the motor 1.

In the present embodiment, the radial width W3 of the reinforcement portion 580 may be 0.1 mm or more and 2 mm or less. If the width W3 of the reinforcement portion 580 is larger than 2 mm, the magnetic flux leaked through the reinforcement portion 580 may increase, and the performance of the motor 1 may be reduced. On the other hand, if the width W3 of the reinforcement portion 580 is smaller than 0.1 mm, the effect of supporting the protrusion portions 530 by the reinforcement portion 580 may be trivial. Thus, it is hard to improve the structural strength of the stacked plates 500. Preferably, the width W3 of the reinforcement portion 580 may be 1 mm or less.

Referring again to FIG. 4, the rotor core 210 may include a first plate member 501 and a second plate member 502. That is to say, the stacked plates 500 constituting the rotor core 210 may include a first plate member 501 and a second plate member 502. One or more first slots 521 may be formed in the first plate member 501. One or more second slots 522 may be formed in the second plate member 502. According to one example, as shown in FIGS. 4 and 5, the slot portions 520 of the first plate member 501 may be all in the form of the first slots 521, and the slot portions 520 of the second plate member 502 may be all in the form of the second slots 522.

Figure 6:
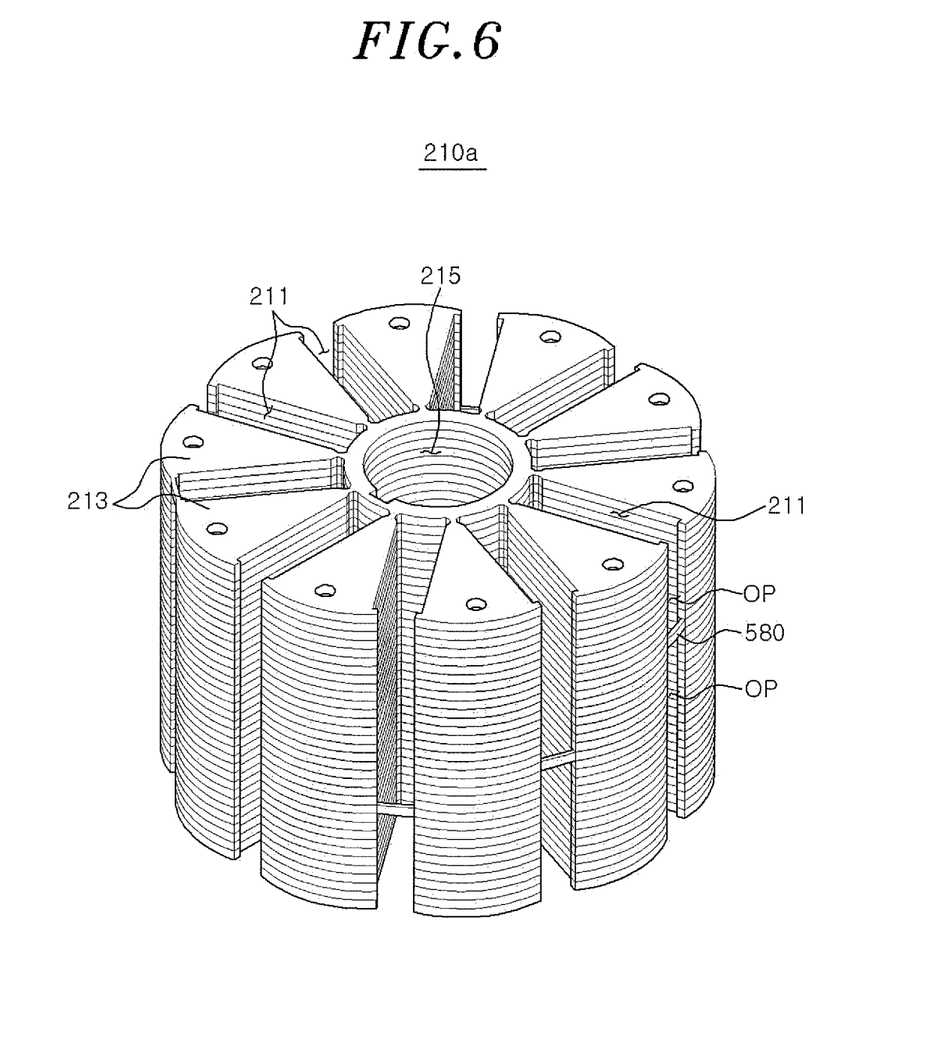
FIG. 6 is a perspective view showing another example of the rotor core shown in FIG. 2.
Figure 7:
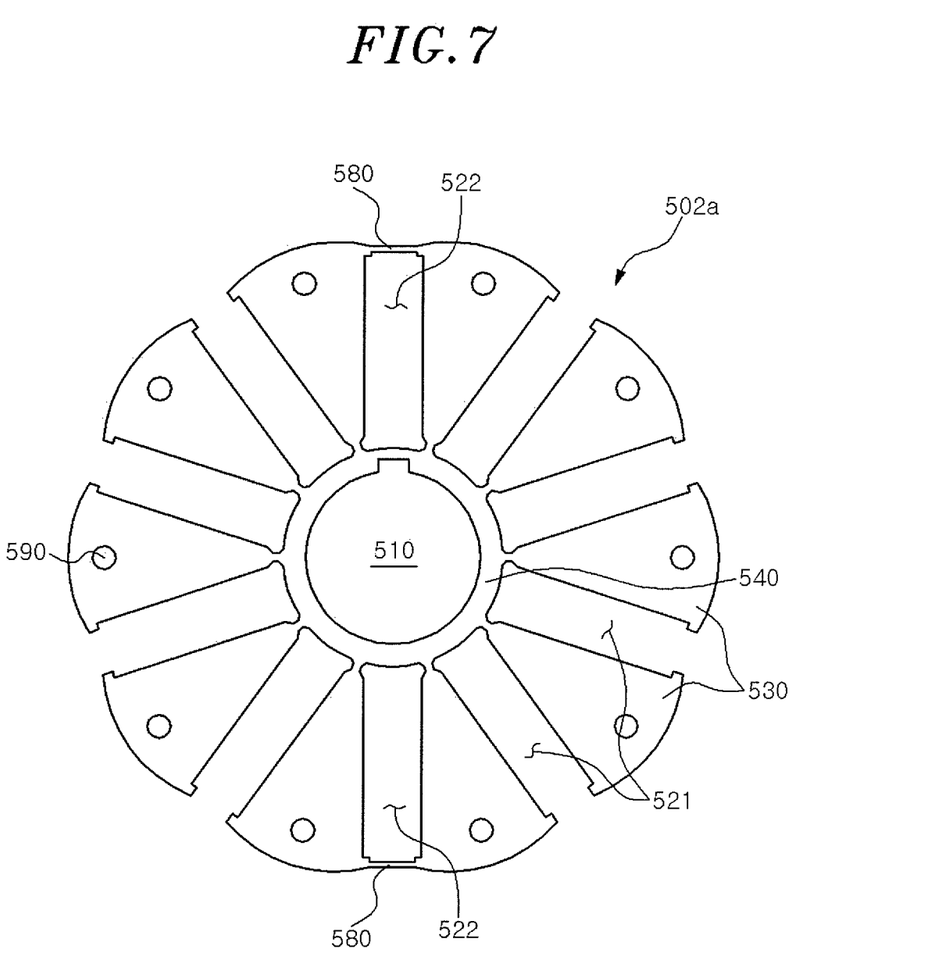
FIG. 7 is a plan view showing one example of the second plate member shown in FIG. 6.

However, in the present invention, the shape of the slot portions 520 formed in the first plate member 501 and the second plate member 502 are limited to the first slots 521 and the second slots 522. For example, as shown in FIGS. 6 and 7 to be described later, one or more second slots 522 may be formed in the first plate member 501 together with the first slots 521, and one or more first slots 521 may be formed in the second plate member 502 together with the second slots 522.

Furthermore, the first plate member 501 and the second plate member 502 may be different from each other. As used herein, the expression "the first plate member 501 and the second plate member 502 are different from each other" may mean that the first plate member 501 and the second plate member 502 are not the same when they are observed in an overlapping state in all directions. For example, as in the example described above, the first plate member 501 may include only the first slots 521, and the second plate member 502 may include only the second slots 522. Alternatively, each of the first plate member 501 and the second plate member 502 may include both the first slots 521 and the second slots 522, and the number and arrangement method of the first slots 521 and the second slots 522 may be different. For example, each of the first plate member 501 and the second plate member 502 may include ten slot portions 520. The first plate member may include seven first slots 521 and three second slots 522. The second plate member 502 may include three first slots 521 and seven second slots 522. Alternatively, the first plate member 501 and the second plate member 502 may include the same number of first slots 521 and the same number of second slots 522. The first plate member 501 and the second plate member 502 may be different from each other in the arrangement method of the second slots 522 between the first slots 521.

However, the idea of the present invention is not limited to the fact that the first plate member 501 and the second plate member 502 are different from each other. In this case, the same number of first slots 521 and the same number of second slots 522 may be formed in the first plate member 501 and the second plate member 502 by the same arrangement method. The first plate member 501 may be rotated in a predetermined direction and may be exactly overlapped with the second plate member 502.

The first plate member 501 and the second plate member 502 described above may be stacked one above the other to form at least a part of the rotor core 210. When the first plate member 501 and the second plate member 502 are stacked, at least one of the first slots 521 of the first plate member 501 and at least one of the second slots 522 of the second plate member 502 may be overlapped with each other. The first slot 521 of the first plate member 501 and the second slot 522 of the second plate member 502 may be overlapped each other to form one magnet-embedded portions 211. In this case, an opening OP may be formed in an axial part of the radial end portion of the magnet-embedded portion 211 (the part in which the first slot is formed), and the reinforcement portion 580 may be formed in the remaining part (the part in which the second slot is formed), so that the magnet-embedded portion 211 can be closed.

The rotor core 210 may be formed by alternately stacking one or more first plate member 501 and one or more second plate member. At this time, the specific first slot 521 of the plurality of first plate member 501 may be overlapped with the specific second slot 522 of the plurality of second plate member 502 to form one magnet-embedded portion 211. As shown in FIGS. 2 and 4, by alternately stacking one or more first plate members 501 and one or more second plate members 502, a plurality of openings OP and a plurality of reinforcement portions 580 may be alternately formed in the outer end portion of one magnet-embedded portion 211 along the axial direction of the rotor. At this time, the axial length H1 of the openings OP may be proportional to the number of the first plate members 501 stacked between two adjacent second plate members 502. The axial length H2 of the reinforcement portions 580 may be proportional to the number of the second plate members 502 stacked between two adjacent first plate members 501.

As an example, as shown in FIGS. 4 and 5, when only the first slots 521 are formed in the first plate member 501 and when only the second slots 522 are formed in the second plate member 502, one second plate member 502 may be stacked for a predetermined number of first plate members 501. In other words, n first plate members 501 may be stacked between two adjacent second plate members 502. In this regard, n may be an integer of 2 or more. For example, n first plate members 501 may be stacked on one second plate member 502, and another second plate member 502 may be stacked thereon. Then, n first plate members 501 and one second plate member 502 may be further stacked sequentially on the second plate member 502. In this case, the axial length H1 of the openings OP formed in the outer end portion of the magnet-embedded portions 211 formed by the first slots 521 and the second slots 522 overlapping with each other may be larger than the axial length H2 of the reinforcement portions 580.

Furthermore, when a plurality of first plate members 501 is provided to one second plate member 502, the number of the first plate members 501 may be determined depending on the diameter of the rotor core 210. In other words, the number n of the first plate members 501 provided between two adjacent second plate members 502 may be correlated with the diameter of the rotor core 210. For example, the larger the diameter of the rotor core 210, the smaller the number n of the first plate members 501. Alternatively, the axial length H1 of the openings OP formed in the outer end portion of each of the magnet-embedded portions 211 may be determined depending on the diameter of the rotor core 210, and the first plate members 501 whose stacking thickness is equal to the axial length H1 may be provided between two adjacent second plate members 502.

The stacking pattern of the first plate members 501 and the second plate members 502 is not limited to the example described above. For example, in one rotor core 210, the number of the first plate members 501 provided between two adjacent second plate members 502 may not be constant. Alternatively, only one first plate member 501 may be provided between two adjacent second plate members 502. Alternatively, two or more second plate members 502 may be stacked one above another, and one or more first plate members 501 may be provided on one side of the second plate members 502.

According to the above-described embodiment, the rotor core 210 includes the second plate member 502 having the reinforcement portions 580, thereby improving the structural strength of the rotor core 210. That is to say, in the prior art, the gap between two adjacent rotor poles 213 is completely opened. This poses a problem that the rotor poles 213 are moved during the high speed rotation of the rotor core 210. In the present embodiment, however, the reinforcement portion 580 formed in the second slot 522 of the second plate member 502 connects the outer end portions of two rotor poles 213 to support the rotor poles 213. Therefore, the structure of the rotor core 210 may be stably maintained even when the rotor 20 is rotated at a high speed. Furthermore, in the related art, each of the rotor poles 213 is supported only by the connection portion 550. Therefore, the width of the connection portion 550 cannot be set to a predetermined value or less. In the present embodiment, however, the reinforcement portion 580 of the second slot 522 additionally supports the rotor poles 213. This makes it possible to further reduce the width of the connection portion 550. As a result, the amount of the magnetic flux leaked to the support portion 540 via the connection portion 550 decreases. This makes it possible to improve the efficiency of the motor 1.

In addition, the reinforcement portions 580 are not formed in all the outer end portions of the magnet-embedded portions 211. Some of the magnet-embedded portions 211 are opened by the first slots 521 of the first plate member

501. As a result, it is possible to minimize the leakage of the magnetic flux through the reinforcement portion 580 in the rotor core 210. Accordingly, it is possible to reinforce the structural strength of the rotor core 210 and to remarkably enhance the efficiency of the motor 1 as compared with a case where the reinforcement portion 580 is formed in all the outer end portions of the magnet-embedded portions 211.

FIG. 6 is a perspective view showing another example 210*a* of the rotor core shown in FIG. 1. FIG. 7 is a plan view showing one example of the second plate member 502*a* shown in FIG. 6.

Referring to FIGS. 6 and 7, one or more second slots 522 and one or more first slots 521 may be formed in the second plate member 502*a*. In this case, in the second plate member 502*a*, the second slots 522 and the first slots 521 may be arranged in a specific pattern along the circumferential direction of the rotor. As an example, as shown in FIG. 7, only two slot portions 520 arranged in alignment with each other may be in the form of the second slots 522, and the remaining slot portions 520 may be in the form of the first slots 521. On the other hand, only the first slots 521 may be formed in the first plate member 501. However, the present invention is not limited thereto.

In this case, the rotor core 210*a* may be formed by alternately stacking one or more first plate members 501 and one or more second plate member 502*a*. One or more second plate members 502*a* may be disposed in a sequentially rotated state. For example, one or more first plate members 501 may be stacked on the second plate member 502*a* in which the second slots 522 on a straight line are arranged in the 12 o'clock-6 o'clock direction. When another second plate member 502 is stacked on the first plate member, another second slot plate 522*a* may be arranged so that the second slots 522 are rotated counterclockwise by a circumferential width of one protrusion portion 530. Then, after one or more first plate members 501 are further stacked on the second plate member 502*a*, another second slot plate 522*a* in which the second slots 522 are further rotated counterclockwise just as much as one protrusion portion 530 may be stacked thereon.

As a result, as shown in FIG. 6, the reinforcement portions 580 formed in the outer end portions of the magnet-embedded portions 211 of the rotor core 210*a* may be arranged in a specific pattern along the outer peripheral surface of the rotor core 210*a*. To this end, in the magnet-embedded portions 211 arranged in the circumferential direction of the rotor, the reinforcement portions 580 may be formed at different positions in the axial direction of the rotor. For example, the position of the reinforcement portion 580 may be axially shifted by a predetermined interval in the adjacent magnet-embedded portions 211. The position of the reinforcement portion 580 may be shifted in a predetermined direction with respect to the axial direction.

Alternatively, unlike the above-described example, the magnet-embedded portions 211 in which the reinforcement portions 580 are formed and the magnet-embedded portions 211 in which the reinforcement portions are not formed may be alternately provided along the circumferential direction of the rotor. In this case, the magnet-embedded portions 211 in which the reinforcement portions are not formed may be formed by overlapping the first slots 521 of one or more first plate members 501 and the first slots 521 of one or more second plate member 502*a*. For example, in the above-described example, the second plates 502*a* may be arranged in a rotated state so that second slots 522 on a straight line are rotated counterclockwise by a circumferential width of two protrusion portions 530 every stacking time. In this case, the magnet-embedded portion 211 whose outer end portion is entirely opened may be formed at the position of the skipped slot portion 520.

As in the present embodiment, if the reinforcement portions are formed in the magnet-embedded portions 211 at different positions in the axial direction of the rotor 20 by stacking the second plate members 502*a* including both the second slots 522 and the first slots 521, it is possible to further reduce the amount of the magnetic flux leaked through the reinforcement portions 580. Since the reinforcement portions formed in the magnet-embedded portions 211 are formed in different plate members, the amount of the magnetic flux leaked through the reinforcement portions in each of the plate members decreases. On the other hand, the reinforcement portions 580 are located at different positions in the axial direction but are uniformly distributed along the circumferential direction of the rotor 20. Thus, it is still possible to maintain the effect of enhancing the structural strength of the rotor core 210*a*.

Figure 8:
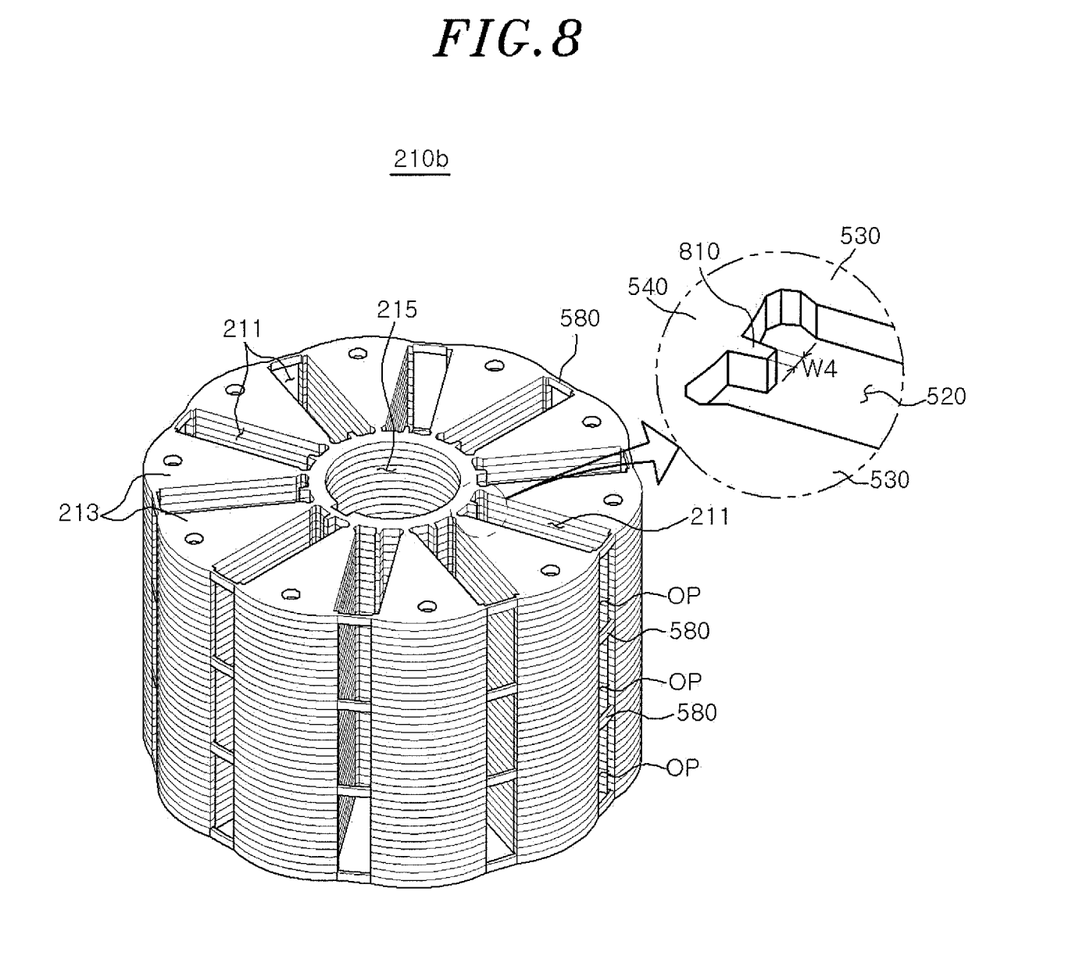
FIG. 8 is a perspective view of a further example of the rotor core shown in FIG. 2.

FIG. 8 is a perspective view of a further example of the rotor core 210*b* shown in FIG. 2.

Referring to FIG. 8, each of the stacked plates 500 forming the rotor core 210*b* may further include a plurality of inner protrusions 810 protruding in the radial direction of the rotor from the inner periphery of the support portion 540. The inner protrusions 810 may protrude from the support portion 540 between two adjacent protrusion portions 530 and may be provided radially inward of the slot portions 520. The tips of the inner protrusions 810 may make contact with the inner end portions of the permanent magnets 220 inserted into the slot portions 520 and may support the permanent magnets 220. The inner protrusions 810 may be provided in a plural number so as to correspond to the plurality of slot portions 520. In addition, the inner protrusions 810 may be integrally formed of the same material as the support portion 540, the connection portions 550 and the protrusion portions 530.

By forming the inner protrusions 810, the permanent magnets 220 may be fixed at right positions inside the slot portions 520. The inner protrusions 810 may push the inner ends of the permanent magnets 220. The outer ends of the permanent magnets 220 may be supported by the outer protrusions 560. Thus, the permanent magnets 220 may be fixed at right positions. Even if a single inner protrusion 810 is formed in the slot portion 520, it is possible to effectively support the permanent magnet 220. This makes it possible to minimize the number of contact points between the inner protrusion 810 and the permanent magnet 220. Therefore, when the permanent magnet 220 is formed by inserting a non-magnetized material into the slot portion 520 and magnetizing the non-magnetized material, it is possible to minimize leakage of the magnetic field for magnetization. This makes it possible to effectively magnetize the permanent magnet 220.

The width W4 of the inner protrusion 810 in the circumferential direction of the rotor may be 0.1 mm or more and 4 mm or less. If the width W4 of the inner protrusion 810 is larger than 4 mm, the area of the portion where the permanent magnet 220 and the inner protrusion 810 make contact with each other may be widened. Thus, the amount of the magnetic field leaked during magnetization of the permanent magnet 220 may be increased, and the contact between the inner protrusion 810 and the permanent magnet 220 may be incomplete. On the other hand, if the width W4 of the inner protrusion 810 is smaller than 0.1 mm and is excessively thin, the structural strength of the inner protrusion 810 may not be enough to stably support the permanent magnet 220.

In addition, the present invention provides a method for manufacturing the rotor core described above.

Figure 9:
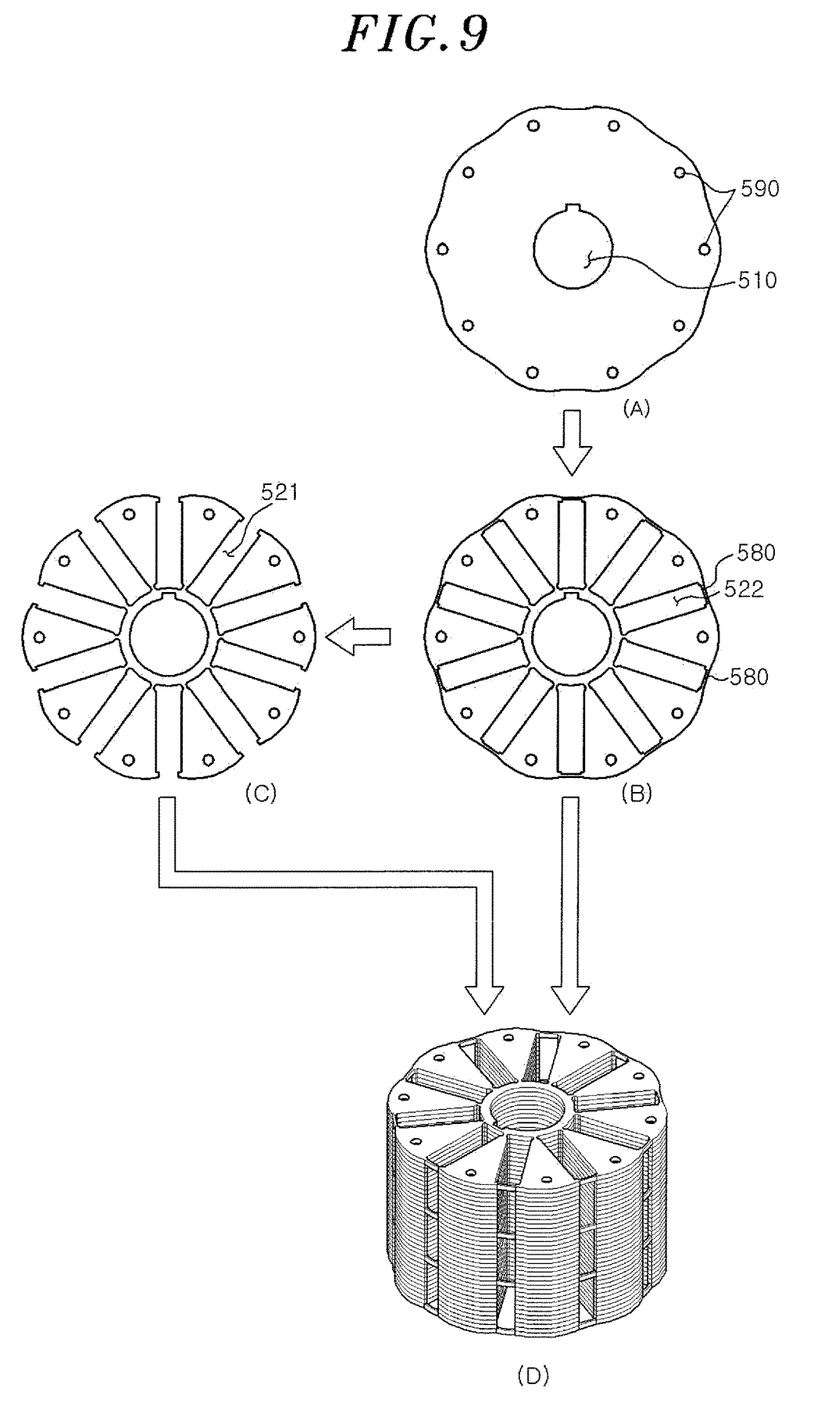
FIG. 9 is a view showing one example of a process for manufacturing a rotor core included in the motor according to one embodiment of the present invention.

FIG. 9 is a view showing a process for manufacturing the rotor core included in the motor according to one embodiment of the present invention.

Referring to FIG. 9, first, the first through-hole 510 and the second through-holes 590 may be formed in a prepared stacked plate material by a press method. In addition, the contour of the stacked plate may be formed by processing the stacked plate material. Moreover, a plurality of joint portions (not shown) protruding toward one side may be formed by pressing the stacked plate material (step A).

Furthermore, a plurality of second slots 522 may be formed in the stacked plate material (step B). By forming the second slots 522, the protrusion portions 530 spaced apart from one another may be formed on both sides of each of the second slots 522. In this regard, the through-hole constituting the second slot 522 is positioned so as to be spaced apart from the outer end of the stacked plate by a predetermined distance. Thus, on the outer side of the second slot 522, there may be formed the reinforcement portion 580 configured to connect the protrusion portions 530 and integrally formed with the protrusion portions 530. The step of forming the second slots 522 may be performed by a punching means including a first press member having an end portion corresponding in shape to the second slot 522.

The step of forming the first through-hole 510, the step of forming the contour of the stacked plate and the step of forming the second through-holes 590 may be performed irrespective of the order.

In the state in which the second slots 522 are formed in the stacked plate, the first slots 521 may be formed by selectively removing the reinforcement portions 580 (step C). That is to say, the first slots 521 may be formed by removing the reinforcement portions 580 only in the portions where the first slots 521 are to be formed. For example, as shown in FIG. 9, when manufacturing the first plate member including only the first slots 521 and the second plate member including only the second slots 522, the stacked plate subjected to the step of forming the second slots 522 described above may be used as the second plate member. As for another stacked plate, the first slots 521 are formed by performing a step of removing all the reinforcement portions 580 formed while forming the second slots 522. The stacked plate thus manufactured may be used as the first plate member. Alternatively, the first slots 521 may be formed by removing the reinforcement portions 580 from some of the second slots 522 formed in on stacked plate. The remaining second slots 522 may be left as the second slots 522.

Specifically, after forming the second slots 522, open end portions (hereinafter referred to as "open portions") may be formed on the radial outer side of the second slots 522 by cutting, at a predetermined width, the reinforcement portions 580 formed while forming the second slots 522. At this time, by cutting the reinforcement portions 580 in conformity with the boundary where the radial width is changed, it is possible to form the outer protrusions inside the first slots 521. The step of cutting the reinforcement portions 580 to form the first slots 521 as described above may be performed by a cutting means.

After the first plate member including the first slots 521 and the second plate member including the second slots 522 are prepared by the above-described steps, the rotor core may be formed by stacking the first plate member and the second plate member (step D). In this regard, the step of stacking the first plate member and the second plate member may include a step of fitting the first plate member and the second plate member using the previously-formed joint portions. The first plate member and the second plate member may be fixed in a stacked state by the coupling between the joint portions of the first plate member and those of the second plate member.

According to the present embodiment, by manufacturing the first plate member and the second plate member on the same process line, it is possible to simplify the manufacturing process. That is to say, since the second slots are formed in the process of forming the first slots, it is unnecessary to construct another process line in order to manufacture the stacked plate including the second slots.

Figure 10:
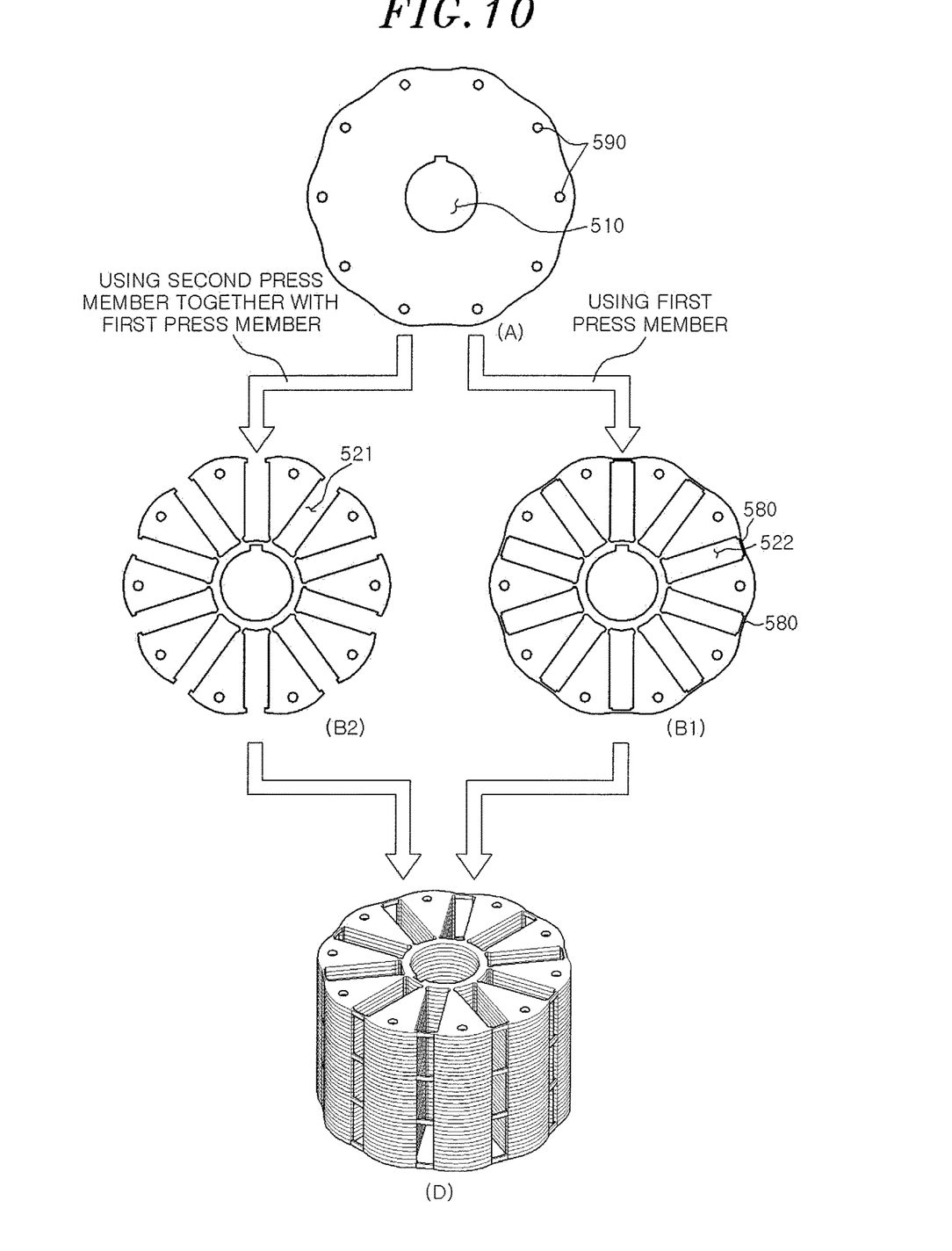
FIG. 10 is a view showing another example of the process for manufacturing the rotor core.

FIG. 10 shows another example of the process for manufacturing the rotor core.

According to the present embodiment, after performing the step (step A) of forming the first through-holes 510, the second through-holes 590 and the contour of the stacked plate, when forming the second slots 522 in the stacked plate material, the reinforcement portions 580 may be removed together from the portions where the first slots 521 are to be formed. That is to say, as shown in FIG. 10, in the step of forming the slots, a step (step B1) of forming the second slots 522 and a step (step B2) of forming the first slots 521 may be selectively executed. In the step (step B2) of forming the first slots 521, the through-holes constituting the second slots 522 are formed together with the open portions. Thus, the first slots 521 may be formed by removing the reinforcement portions 580 simultaneously with the formation of the second slots 522.

According to one example, when the reinforcement portions 580 are removed simultaneously with the formation of the second slots 522, the punching means may include the first press member and a second press member having an end portion corresponding in shape to the open portion. When the second slots 522 are to be formed, a punching process may be performed in a state in which the second press member is removed from the punching means. When the first slots 521 are to be formed, the punching process may be performed by the first press member and the second press member mounted together.

The step of forming the first through-hole, the step of forming the second through-holes, the step of forming the contour of the stacked plate and the step of forming the first slots or the second slots may be performed irrespective of the order.

After the stacked plate including the first slots 521 and the stacked plate including the second slots 522 are prepared by the above-described steps, the rotor core may be formed by overlapping the stacked plates (step D).

In the case where the first slots or the second slots are selectively formed while adding or removing the press members to and from the same punching means as in the present embodiment, it is possible to further simplify the manufacturing process. Basically, the punching means is driven so as to form the first slots. In the portions where the second slots are to be formed, the punching process may be performed by merely removing the second press member from the punching means.

While particular embodiments of motor rotor including rotor core and manufacturing method therefor have been described, it is merely illustrative and are not intended to limit the scope of the present invention and should be construed as having widest range based on the spirit of present invention. Those skilled in the art may combine and substitute the disclosed embodiments to perform a particular pattern of shape that has not been noted, but it is also within the scope of the present invention. It will be apparent to those skilled in the art that various changes and modifications may be readily made without departing from the spirit and scope of the invention.

What is claimed is:

1. A motor rotor which is disposed inside a stator to rotate by electromagnetically interacting with the stator, the motor rotor comprising:
   a rotor core formed by stacking a plurality of stacked plates including first plate members and second plate members, the rotor core including a shaft hole into which a shaft is inserted, a plurality of rotor poles arranged outside the shaft hole so as to be spaced apart from one another along a circumferential direction of the rotor, and a plurality of magnet-embedded portions formed between the rotor poles; and
   a plurality of permanent magnets inserted into the magnet-embedded portions,
   wherein each of the first plate members includes at least one first slot extending in a radial direction of the rotor and having an open radial outer end,
   wherein each of the second plate members includes at least one second slot extending in the radial direction of the rotor and having a closed radial outer end,
   wherein the first slot of each of the first plate members and the second slot of each of the second plate members are overlapped with each other to form at least one of the magnet-embedded portions,
   wherein each of the first plate members and the second plate members includes a plurality of protrusion portions arranged so as to be spaced apart in the circumferential direction and stacked to form the rotor poles,
   wherein each of the first plate members and the second plate members includes outer protrusions protruding in the circumferential direction front outer ends of the protrusion portions and configured to support an outer end portion of each of the permanent magnets, and a reinforcement portion is configured to connect the outer protrusions opposite to each other and is provided only at each of the second plate members,
   wherein a radial width of the reinforcement portion is smaller than a radial width of the outer protrusions,
   wherein the radial width of the reinforcement portion ranges from 0.1 mm to 2 mm,
   wherein the first plate members and the second plate members are alternately stacked to form the rotor core, the first slot being provided only at the first plate members, the second slot being provided only at the second plate members,
   wherein two or more of the first plate members are stacked between two adjacent second plate members, and
   wherein an axial length of the open portions is inversely proportional to an outer diameter of the rotor core.

2. The motor rotor of claim 1, wherein the reinforcement portion is integrally formed with the protrusion portions.

3. The motor rotor of claim 1, wherein each of the first plate members and the second plate members further includes an annular support portion provided at a center thereof with a first through-hole defining the shaft hole, and a plurality of connection portions radially extending from an outer periphery of the support portion and configured to connect the support portion and the protrusion portions.

4. The motor rotor of claim 1, wherein each of the first plate members and the second plate members further includes a plurality of inner protrusions radially extending from an outer periphery of the support portion between the protrusion portions and configured to support inner end portions of the permanent magnets inserted in the magnet-embedded portions.

5. The motor rotor of claim 4, wherein a single contact point is formed between each of the inner end portions of the permanent magnets and each of the inner protrusions.

6. A method for manufacturing a motor rotor, comprising:
   a step of forming a plurality of second slots in a first plate member and a second plate member, the second slots arranged so as to be spaced apart from one another along circumferential direction of the rotor, the second slots extending in a radial direction of the rotor, each of the second slots having a closed radial outer end;
   a step of forming a first slot in the first plate member by removing the closed radial outer end of each of the second slots, the first slot having an open radial outer end; and
   a step of forming a stator core by stacking the first plate member and the second plate member so that the first slot of the first plate member overlaps with one of the second slots of the second plate member,
   wherein each of the first olate member and the second plate member includes a plurality of protrusion portions arranged so as to be spaced apart in the circumferential direction and stacked to form rotor poles,
   wherein each of the first plate member and the second plate member includes outer protrusions protruding in the circumferential direction from outer ends of the protrusion portions, and a reinforcement portion is configured to connect the outer protrusions opposite to each other and is provided only at each of the second plate member,
   wherein a radial width of the reinforcement portion is smaller than a radial width of the outer protrusions,
   wherein the radial width of the reinforcement portion ranges from 0.1 mm to 2 mm,
   wherein the first plate member and the second plate member are alternately stacked to form the rotor core the first slot being provided only at the first plate member, the second slot being provided only at the second plate member,
   wherein two or more of the first plate members are stacked between two adjacent second plate members, and
   wherein an axial length of the open portions is inversely proportional to an outer diameter of the rotor core.

7. The method of claim 6, wherein in the step of forming the first slot in the first plate member, the closed radial outer end of each of the second slots is opened while forming the second slots in the first plate member.

8. The method of claim 7, wherein the second slots are formed in the second plate member using a first press member, and the first slot is formed in the first plate member using a second press member together with the first press member.

9. The method of claim 6, wherein in the step of forming the first slot in the first plate member, the closed radial outer end of each of the second slots is opened using a cutting means.

* * * * *